(12) United States Patent
Benner

(10) Patent No.: US 7,423,768 B2
(45) Date of Patent: Sep. 9, 2008

(54) SCANNING UNIT FOR A POSITION MEASURING SYSTEM FOR THE OPTICAL SCANNING OF A SCALE AND POSITION MEASURING SYSTEM UTILIZING SUCH A SCANNING UNIT

(75) Inventor: Ulrich Benner, Trostberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 353 days.

(21) Appl. No.: 11/391,885

(22) Filed: Mar. 29, 2006

(65) Prior Publication Data
US 2006/0227341 A1    Oct. 12, 2006

(30) Foreign Application Priority Data
Apr. 6, 2005  (DE) .................. 10 2005 015 743

(51) Int. Cl.
*G01B 11/14*    (2006.01)
(52) U.S. Cl. .................. 356/616; 250/559.29
(58) Field of Classification Search .............. 356/614, 356/616, 620
See application file for complete search history.

(56) References Cited

U.S. PATENT DOCUMENTS

| | | | | |
|---|---|---|---|---|
| 5,991,040 | A * | 11/1999 | Doemens et al. | 356/614 |
| 2003/0016369 | A1* | 1/2003 | Benner et al. | 356/616 |
| 2004/0227958 | A1* | 11/2004 | Benner et al. | 356/616 |
| 2004/0246500 | A1 | 12/2004 | Holzapfel et al. | |

FOREIGN PATENT DOCUMENTS

DE   103 17 736 A1   10/2004

OTHER PUBLICATIONS

U.S. Appl. No. 10/821,518, filed Apr. 11, 2003, Holzapfel et al.

* cited by examiner

*Primary Examiner*—Roy M Punnoose
(74) *Attorney, Agent, or Firm*—Brinks Hofer Gilson & Lione (57) ABSTRACT

A scanning unit for a position measuring system for the optical scanning of a scale, the scanning unit including a light source for transmitting light in a direction toward a section of a scale and a detector for receiving light modified by the scale. A lens arrangement placed in front of the detector, the lens arrangement having a plurality of optical lenses and is used for generating a definite image of a scanned scanning area in an image field on the detector, wherein the lens arrangement optically images the scanning area reduced in surface in the image field on the detector.

14 Claims, 7 Drawing Sheets

SCANNING UNIT FOR A POSITION MEASURING SYSTEM FOR THE OPTICAL SCANNING OF A SCALE AND POSITION MEASURING SYSTEM UTILIZING SUCH A SCANNING UNIT

Applicant claims, under 35 U.S.C. § 119, the benefit of priority of the filing date of Apr. 6, 2005 of a German patent application, copy attached, Ser. No. 10 2005 015 743.2, filed on the aforementioned date, the entire contents of which is incorporated herein by reference.

BACKGROUND OF THE INVENTION

1. Field of the Invention

The present invention relates to a scanning unit for a position measuring system for the optical scanning of a scale, having a light source for transmitting light in the direction toward a section of the scale, a detector for receiving the light modified by the scale, and a lens arrangement placed in front of the detector. The present invention further relates to a position measuring system utilizing such a scanning unit.

2. Discussion of Related Art

A scanning unit may include a light source for transmitting light in the direction of the scale which is provided with a track which can be optically scanned, a detector for receiving the light which was modified, for example reflected, by the scale, as well as a lens arrangement having a plurality of lenses and arranged in front of the detector for generating on the detector a defined image of an area scanned by the light. The scanned area can for one be a scanned area on the scale, or an intermediate image in the scanning light beam.

Such a scanning unit can be provided, for example, for scanning a scale provided with an incremental graduation by the incident or transmitted light method. In the first mentioned case, the light transmitted by the light source in the direction of the scale is modified by the scale and reflected. In the second case mentioned, the light transmitted by the light source passes through the (partially transparent) scale and is modified in the process. Such a scanning unit, including a position measuring device, is known from DE 103 17 736 A1.

Optical imaging, or projection, of the scanning area scanned on the scale takes place via the two part lens arrangement in the beam path at different possible optical imaging magnifications $\beta=1$, or $\beta>1$, or $\beta<1$, onto an area identical in regard to the surface measure, or onto an image field identical in regard to the surface measure in the detector plane.

The surface, or the area, remains of the same size on the part of the object and the image in all cases of the resultant picture. This means that the scanned scanning area, including the information contained therein, is transmitted to an image field of the same size on the detector. Thus, in connection with such systems there is the basic requirement for as large as possible a scanned area. In the case of a scanning area on the scale, the entire system is possibly less sensitive to soiling or contamination. In the case of optical imaging a scanning area of the same size of the image and the object, definite minimally required detector areas result, which cannot be decreased without loss of information.

However, the detector area is a basically critical value in connection with such scanning units, in particular if, for example, CMOS photodiodes are employed as detectors. For one, because the available area can be very expensive, depending on the respectively used manufacturing process, and also for the reason that with an increasing detector area the capacity of the photodiodes also increases, which in turn results in a large proportion of noise in the signal to be detected.

Figure 1A:
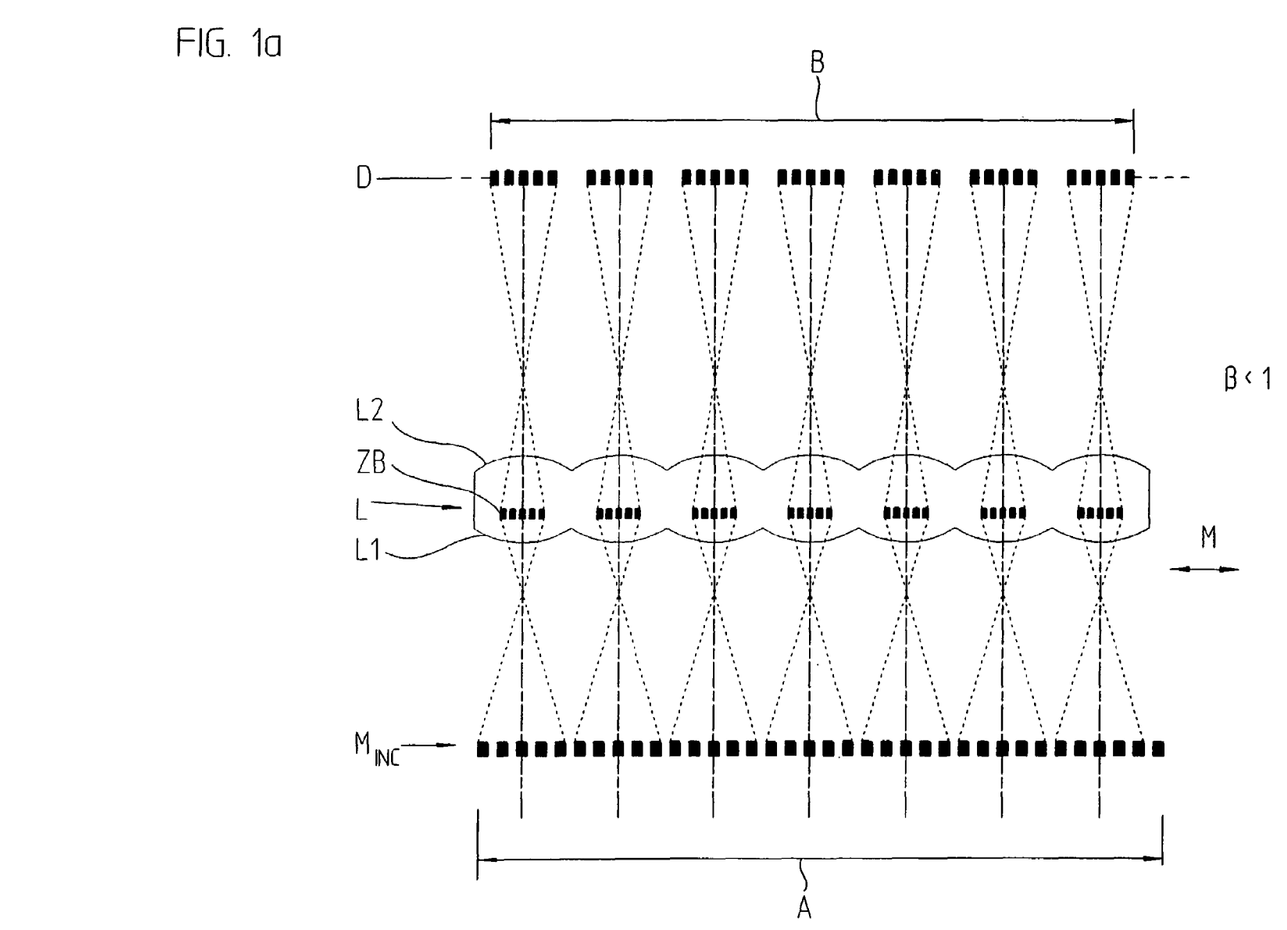
FIGS. 1a and 1b show the representational conditions in the case of employing a lens arrangement in accordance with the prior art.
Figure 1B:
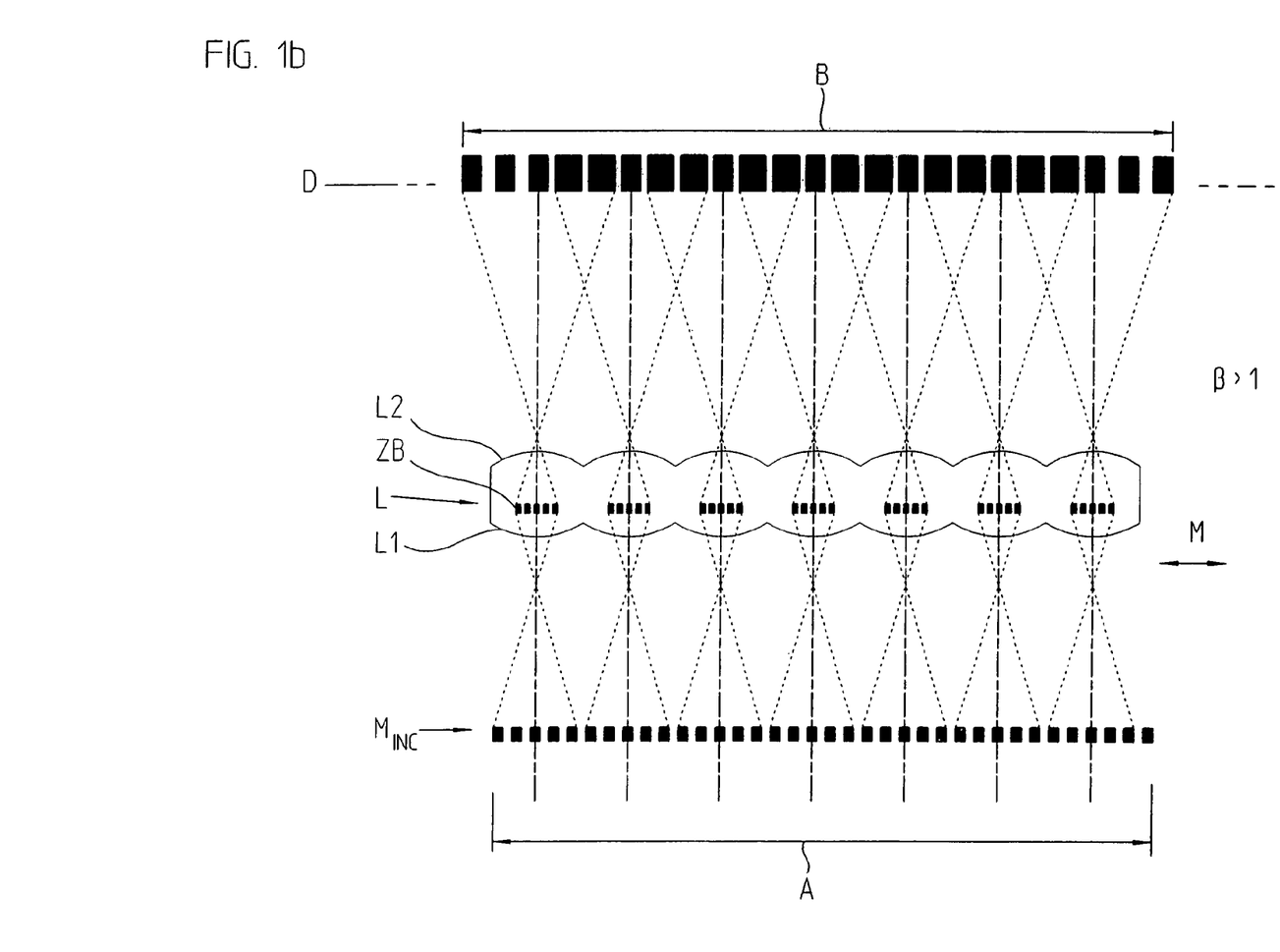

In the case of using a lens arrangement as known from DE 103 17 736 A1, at an image magnification of $\beta=1$ the information regarding the scanned periodic incremental graduation is retained as mentioned in the generated image in the detection plane when the scanned area and the generated image have the same area. However, in the case of realized scanning magnification of $\beta\neq1$, when using such lens arrangements the correct information regarding the scanned periodic incremental graduation does not result in the image on the detector side. For illustrating this problem, the image conditions in regard to a scanned incremental graduation of the image magnifications $\beta<1$ (FIG. 1a) and $\beta>1$ (FIG. 1b) are shown in FIGS. 1a and 1b. Here, a section of an incremental graduation $M_{INC}$ is respectively pictured by a known two-part lens arrangement L, wherein the section A corresponds to the scanning area on the part of the object. Following the optical imaging of a portion of this section via a first single lens L1 of the lens arrangement L, an intermediate image ZB results, this is optically imaged via a second assigned single lens L2 as an image in the image or detection plane D, while maintaining the size of the image field B, i.e. A=B. This takes place analogously by each individual pair of lenses of the lens arrangement L.

In the case of FIG. 1a with an image magnification $\beta<1$, a reduction of the size of a section A of the incremental graduation $M_{INC}$ in the detection plane D takes place per image. As a whole, an image of the incremental graduation $M_{INC}$ of the same size as the scanned section A results in the image field B. However, the periodicity of the scanned incremental graduation $M_{INC}$ is no longer correctly represented in the image, as can be seen in FIG. 1a.

In the case of FIG. 1b with an image magnification $\beta>1$, an image results in the detection plane D from the scanning of the section A of the incremental graduation $M_{INC}$, which results from an undefined superimposition of individual partial images. The periodicity of the scanned incremental graduation $M_{INC}$ is no longer correctly represented in the image.

Similar problems exist of course if, for example with a different scanning principle, an intermediate image is to be optically imaged in an image field on the detector instead of a scanned area on the scale.

OBJECTS AND SUMMARY OF THE INVENTION

An object of the present invention is to provide a scanning unit for a position measuring system of the type mentioned at the outset, which makes it possible to minimize the required detector area without a loss of information in the image resulting from this.

In accordance with the present invention, this object is attained by creating a scanning unit for a position measuring system for the optical scanning of a scale, the scanning unit including a light source for transmitting light in a direction toward a section of a scale and a detector for receiving light modified by the scale. A lens arrangement placed in front of the detector, the lens arrangement having a plurality of optical lenses and is used for generating a definite image of a scanned scanning area in an image field on the detector, wherein the lens arrangement optically images the scanning area reduced in surface in the image field on the detector.

This object is also accomplished by a position measuring system including a scale with an optically scannable track and a scanning unit. The scanning unit including a light source for transmitting light in a direction toward a section of the scale and a detector for receiving light modified by said scale and a lens arrangement placed in front of the detector. The lens arrangement including a plurality of optical lenses and is used for generating a definite image of a scanned scanning area in an image field on the detector, wherein the lens arrangement optically images the scanning area reduced in surface in the image field on the detector.

In accordance with the present invention it is provided to design the lens arrangement in the scanning unit in such a way that an image reduction is possible by this. This means that the scanned area, or the corresponding image field, is optically imaged on the respective detector with the complete and correct information content in a reduced form.

Depending on the scanning principle, this scanned area can here be a defined area of the scale, as well as an intermediate image in the scanning beam.

The lens arrangement used preferably contains two lens groups, or micro lens arrays, on two levels extending parallel with respect to each other. The patterns of the two lens groups differ in a defined manner from each other.

In an advantageous embodiment, the two lens groups work together optically in such a way that after the intermediate image resulting after the first optical imaging via a lens of the first lens group, the second optical imaging is transmitted to the detector via a lens of the second lens group as a partial image, which is axially offset with respect to the scanned area. In the course of the second optical imaging, an offset in the direction of an axis of symmetry of the lens arrangement takes place. The total image on the detector results from the superimposition of all partial images in a phase-correct manner.

In a further embodiment, an optical device is placed ahead of the light source in the scanning unit for adapting the illumination beam in the image field on the detector in regard to the reduced image of the scanned area.

In accordance with the present invention, scales with incremental graduations, as well as with a periodic reference markings, can be scanned, and suitable position measuring systems can be constructed therefrom.

It can be stated that an important advantage of the steps in accordance with the present invention is the reduction of the detector area, regardless of the type of detector used. By this it is possible in turn to reduce processing costs for manufacturing, as well as to increase the signal quality because of the lower capacities of the smaller detectors.

In principle it is possible to realize scanning with transmitted, as well as with incident light in connection with the steps in accordance with the present invention. The same applies with respect to linear and rotary position measuring systems.

Further characteristics and advantages of the present invention will be explained by the following description of exemplary embodiments in connection with the drawing figures.

DETAILED DESCRIPTION OF THE PREFERRED EMBODIMENTS

Figure 2:
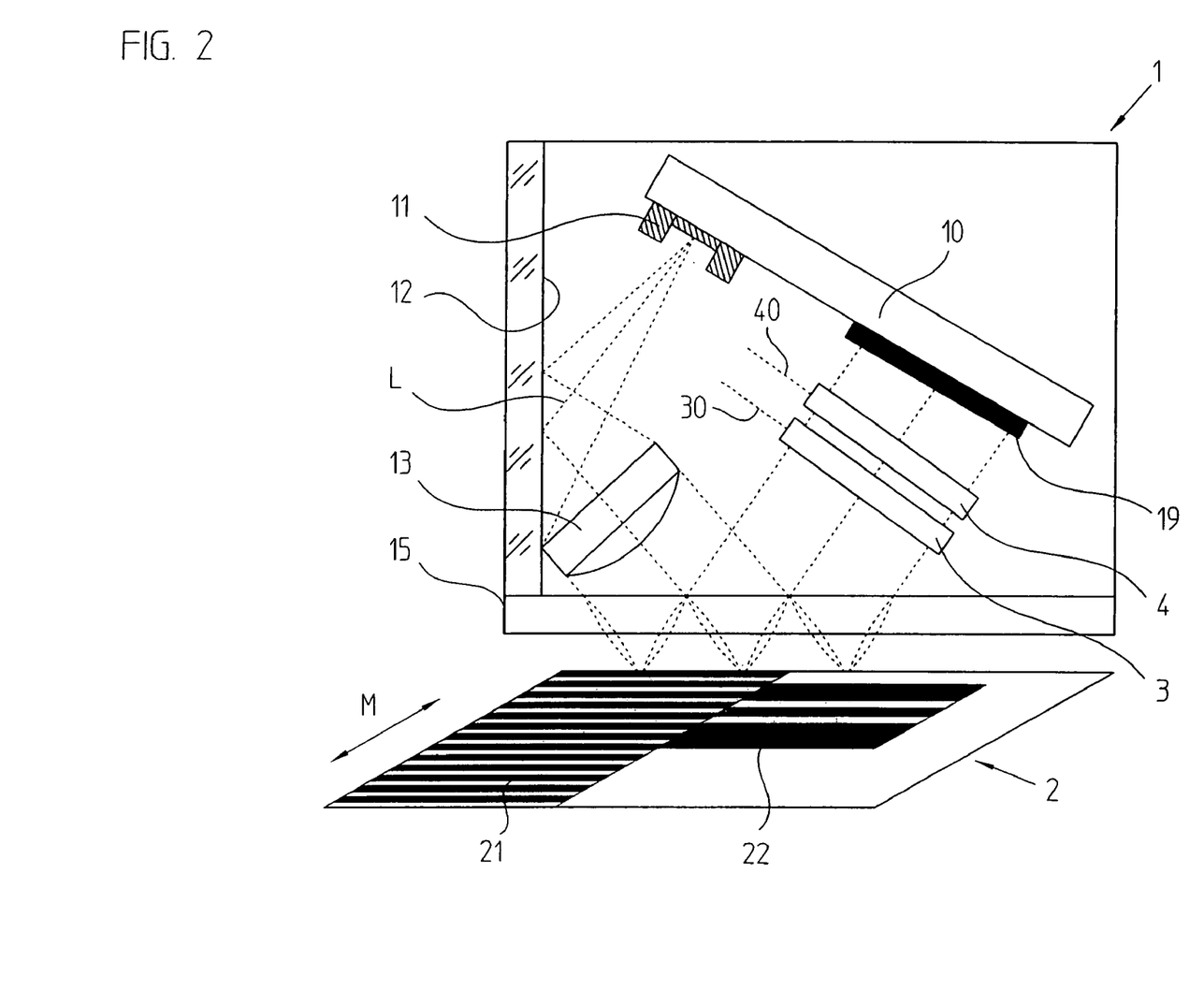
FIG. 2 represents a greatly schematized representation of an embodiment of an incident light position measuring system with an embodiment of a scanning unit in accordance with the present invention.

FIG. 2 shows a position measuring system for a linear measurement, which is operated in incident light. A scale 2 extends in a measuring direction M, opposite which a scanning unit 1 for scanning the scale 2 is arranged, relatively movable in the measuring direction M.

The scale 2 has a track with an incremental graduation 21 in the form of a linear, periodic bar graduation extending along the measuring direction M, as well as a track, arranged beside the incremental graduation 21, with at least one reference marking 22. By scanning the incremental graduation 21 by the scanning unit 1 during a movement of the scanning unit 1 in relation to the scale 2 in the measuring direction M, the magnitude of the movement of the scanning unit 1 relative to the scale 2 (relative movement) can be determined. The reference marking 22 makes possible the determination of the absolute reference at the reference position. Several reference markings can of course be provided along the measurement path.

In the represented example, the opto-electronic scanning unit 1 used for scanning the scale 2 has a printed circuit board 10, on which a light source 11 in the form of a light-emitting diode is arranged, as well as a photoelectric detector 19 at a distance from the light source 11. The detector 19 includes separate detector units—not visible in this representation—for scanning the incremental graduation 21 and the reference marking 22.

The printed circuit board 10 with the light source 11 and the photoelectric detector 19 is arranged in a scanning housing, whose lateral wall 12 facing the light source 11 is embodied metal-coated as a reflection surface in the present example. The light beams L emitted by the light source 11 are reflected by the lateral wall to a condenser lens 13, from where the light beams L are conducted as a parallelized beam through a glass plate 15, which constitutes the bottom of the scanning housing, to the scale 2 in the present example.

In the exemplary embodiment of FIG. 2, the position measuring system is embodied as a system operated by the incident light method. After passing through the glass plate 15, the light emitted by the light source 11 and made parallel by the condenser lens 13 is reflected at the scale 2, and a defined strip pattern is generated in the detection plane via the optical image by the lens arrangement with two lens groups 3, 4. Furthermore, a characteristic signal regarding the reference marking 22 can be generated because of the modification of the light beams by the reference marking 22 and the optical imaging by the lens arrangement with the two lens groups 3, 4.

By the steps on the part of the lens arrangement in the scanning beam path, which will still be explained in detail in what follows, the scanned area of the scale 2 is optically imaged in the exemplary embodiment shown completely, but reduced, as an image field on the detector 19. It is possible in this way to reduce the required detector area. As represented in FIG. 2, the lens arrangement includes two lens groups 3, 4, which are respectively arranged in one of two levels 30, 40 extending parallel with respect to each other. These matters will be explained in even greater detail by the following description of a further exemplary embodiment in FIG. 3.

The scanning beam path in a further position measuring system is represented in FIG. 3 again in a greatly schematized manner in a second exemplary embodiment of a scanning unit in accordance with the present invention. In contrast to the first example, now a position measuring system using transmitted light is provided, which is operated in connection with a second exemplary embodiment of a scanning unit in accordance with the present invention.

A linearly designed scale 200 and a scanning unit are arranged, which again are movable with respect to each other in the measuring direction M. For reasons of improved clarity, only a portion of the components arranged in the scanning unit can be seen in the representation of FIG. 3, the representation of a scanning housing was omitted inter alia.

Figure 3:
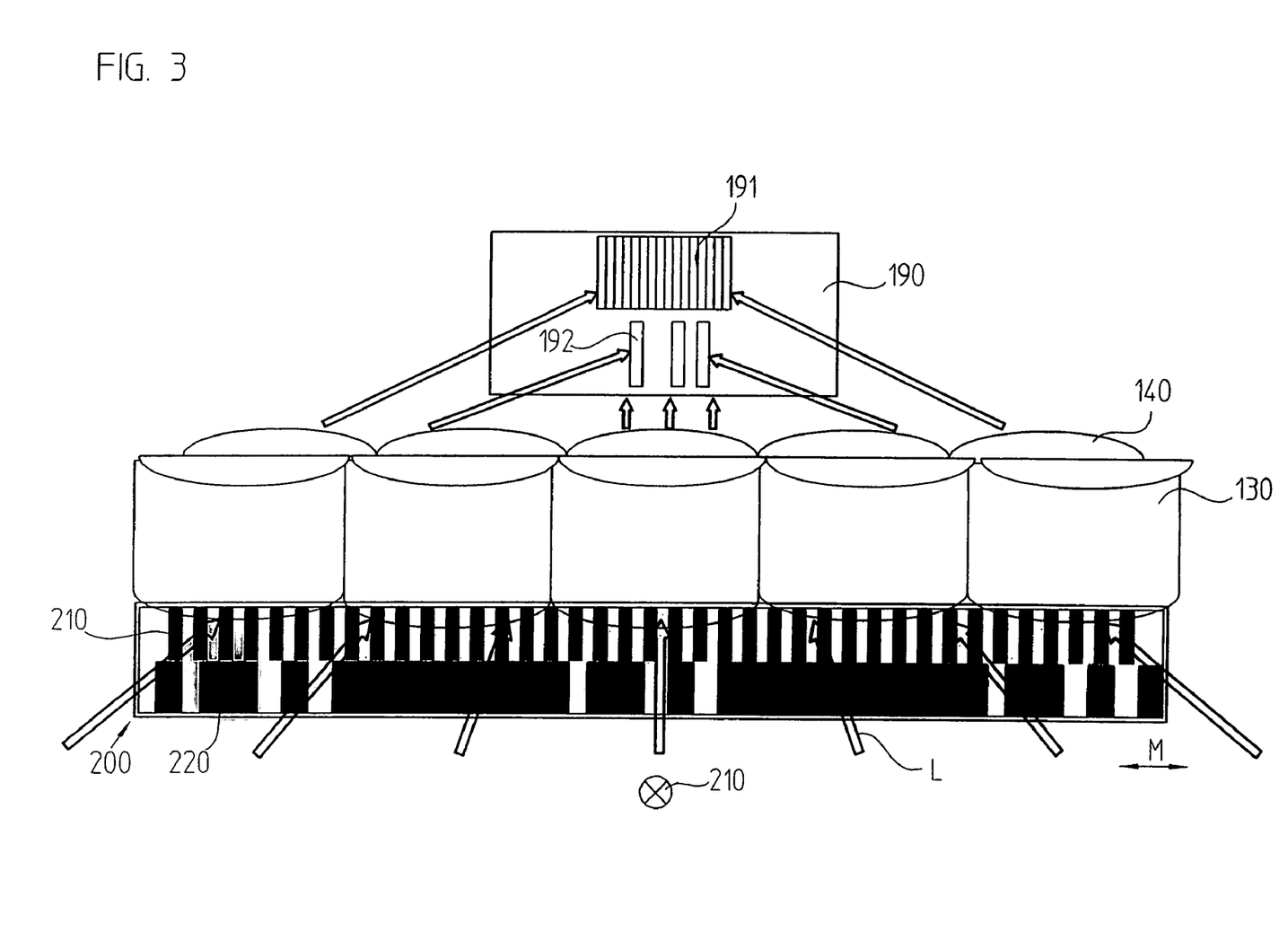
FIG. 3 represents a greatly schematized representation of an embodiment of a transmitted light position measuring system with a second embodiment of a scanning unit in accordance with the present invention.

A track with an incremental graduation 210, which includes periodically alternating partial areas of different opacity, is arranged on the part of the scale 200. A reference marking 220 is provided on the scale 200 next to the track with the incremental graduation 210, which includes an aperiodic sequence of partial areas of differing opacity. From the scanning of the incremental graduation 210, which now takes place in transmitted light, it is possible to generate incremental signals. These represent a measure of the relative movement between the scale 200 and the scanning unit along the measuring direction M. But the reference marking 220 is used for generating a reference pulse signal at a defined reference position along the measuring direction M.

Of the components on the scanning side, the light source 210, the lens arrangement with two lens groups 130, 140, or two micro lens arrays, as well as the detector 190 with separate detector units 191, 192 for the incremental signals and the reference pulse signals, can be seen in the representation of FIG. 3.

It is intended by the arrows representing the light beams L in FIG. 3 to schematically indicate the optical imaging of scanning areas on the scale 200 via the lens arrangement with the two lens groups 130, 140 in a reduced image field in the detector plane.

In the instant example, a lens arrangement including two lens groups 130, 140 is provided, which is employed for optical imaging scanning areas of the incremental graduation 210, as well as of the reference marking 220. Alternatively to this it is of course possible to use separately optimized lens arrangements for these purposes.

As can be seen in FIG. 3, the lens arrangement in the scanning unit includes two lens groups 130, 140, or micro lens arrays, each of which is arranged in one of two parallel extending levels. Each individual lens group 130, 140 in turn includes a plurality of identical individual lenses. In this case the two lens groups 130, 140 are arranged in a defined pattern in the measuring direction M, wherein the patterns of the two lens groups 130, 140 definitely differ from each other. The offset between the two lens groups 130, 140 resulting from the different patterns is schematically indicated in FIG. 3. Based on the selected offset, the desired imaging properties of the lens arrangement, i.e. the reduced image of the scanning area in the image field on the part of the detector, is assured in the end.

The principles and circumstances which are the basis of this image will now be described in greater detail by FIGS. 4a and 4b.

Figure 4A:
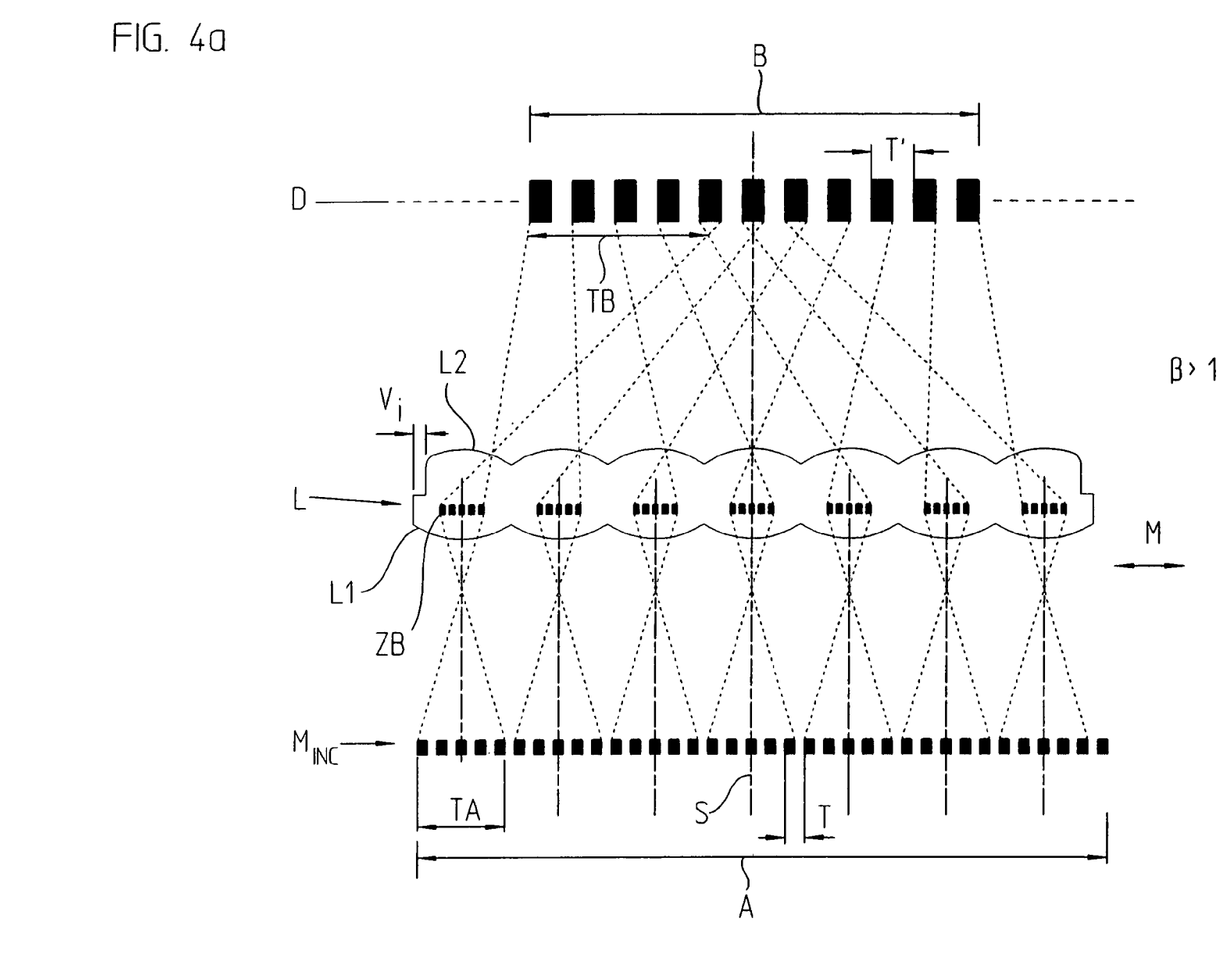
FIGS. 4a and 4b respectively are schematic representations for explaining the scanning of a scale with an incremental graduation with the aid of the scanning units of FIGS. 2 and 3 in accordance with the present invention.
Figure 4B:
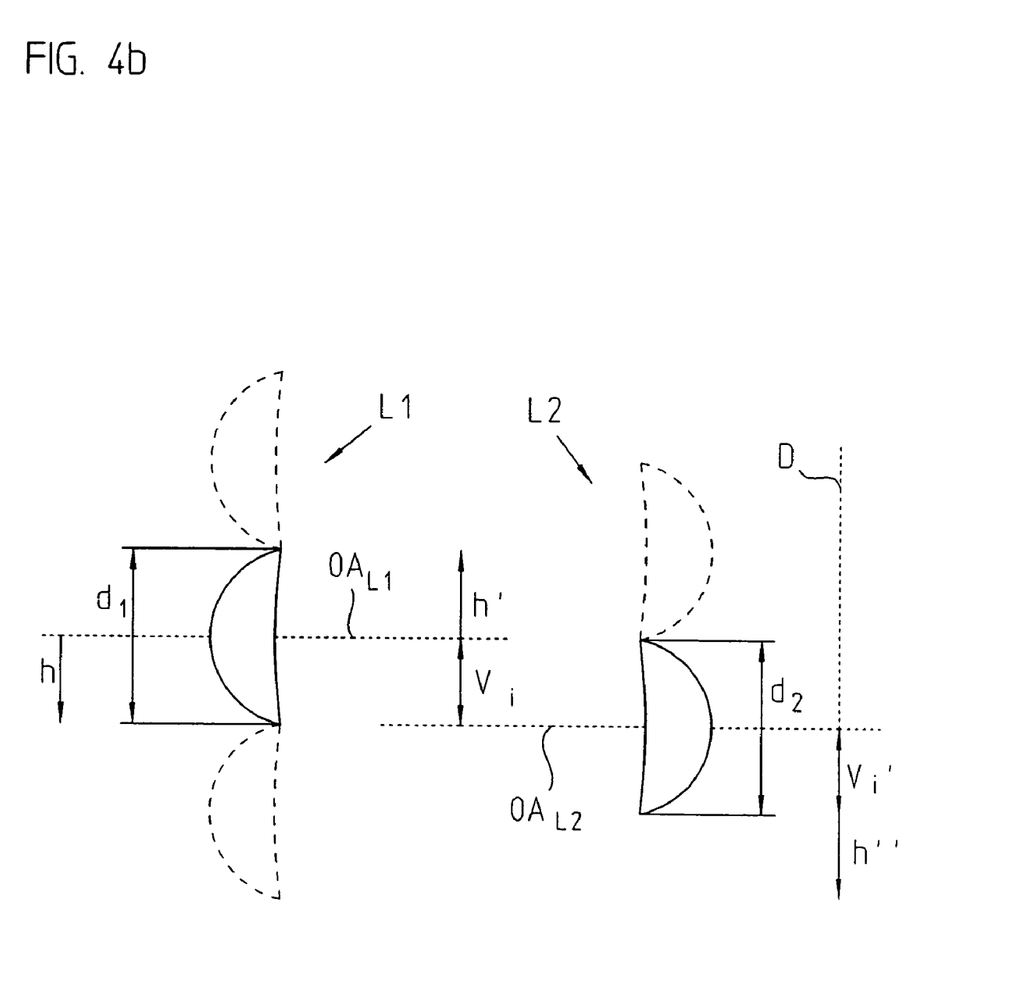

In a schematic form, FIG. 4a shows the optical imaging of a scanning area A of a periodic incremental graduation $M_{INC}$ with the aid of two lens groups L1, L2 of a lens arrangement L on a reduced image field B in the detector plane D. The detector, which can be designed in a known manner as a flat detector element or photodiode array and is arranged in the detector plane, is not represented. The image magnification $\beta$ used in this exemplary image has been selected to be larger than 1, however, in principle it could also be selected to be different.

Initially, in a first optical imaging step, a portion or a partial area TA of the scanning area A of the periodic incremental graduation $M_{INC}$ is optically imaged as one or several intermediate images ZB by the individual lenses of the first lens group L1. The created intermediate images ZB are located in an intermediate image plane between the first and second lens groups L1, L2 of the lens arrangement L. Finally, the different intermediate images ZB are pictured in the detector plane D, phase-correctly superimposed by lenses of the second lens group L2. The desired image field reduction in the image field B in the detection plane D results because of the correct superimposition of the partial images TB on the image side resulting in the second image step. Here, the definite offset distance $V_i$, already mentioned above, of the individual lenses of the second lens group L2 in contrast to the associated lenses of the first lens group L1 in the measuring direction M contributes to the image field-reducing superimposition of the different intermediate images in the second image step. The patterns of the two lens groups L1, L2 accordingly differ in a definite way. The offset distance $V_i$ for the first pair of lenses of the two lens groups L1, L2 is schematically indicated in FIG. 4a. The offset distance $V_i$ between the lenses of the two lens groups L1, L2 which are assigned to each other varies along the measurement direction M. Thus, in the present example it has been provided that a central lens of the second lens group L2 is arranged symmetrically in relation to an axis of symmetry S of the entire lens arrangement, the lenses of the second lens group L2 adjoining to the left and right in the measuring direction M have an offset distance $V_i$ which, starting at the axis of symmetry S, increases from one pair of lenses to the next in regard to the respectively assigned lens of the first lens group L1. This means that the outside located lenses of the second lens group L2 respectively have the greatest offset distance $V_i$ with respect to the associated lens of the first lens group L1.

As can be seen from the individual scanning beam paths indicated in FIG. 4a, because of the offset arrangement of the lenses of the second lens group L2 the farther outward located partial areas TA of the scanning area A to be optically imaged are shown in the detection plane D offset in the direction of the axis of symmetry S. Thus, for example, the partial area TA located at the left outside is optically imaged in a partial area TB on the image side, which is offset in the direction toward the axis of symmetry S. Simultaneously, in the present example a magnification of the scanned partial area A in the image TB results, i.e. an image magnification $\beta > 1$ was selected. Based on this image scale, the periodic structure in the image has a graduation period $T' = \beta * T$.

The image of the scanning area A, whose image field is reduced in the end, results from the phase-correct superimposition of all individual partial images TB. However, because of the suitable selection of the offset, it is simultaneously assured that the periodicity of the scanned incremental graduation $M_{INC}$ in the scanning area A, and therefore information which is usable at the detector, is preserved by the optically imaging by the lens arrangement L.

In what follows, geometric connections regarding the optically imaging taking place by the lens arrangement will be explained in detail by FIG. 4b. In this drawing figure the optical image of the object h via the two lenses L1, L2 of the lens arrangement in the intermediate image h' and the resultant image h" in the detection plane D are shown.

Furthermore, various geometric values have been drawn in FIG. 4b, to which reference is made in the following description. The lens width of the lenses of the first and second lens groups L1, L2 in the extension direction of the respective lens group L1, L2 is identified by d1 or d2. The value $V_i$ indicates the offset of the optical axes $OA_{L1}$, $OA_{L2}$ of the lenses of the first and second lens groups L1, L2, which are assigned to each other. As already indicated above, the offset varies in a defined manner along the direction of extension of the lens arrangement.

The image resulting via the lens arrangement L has the resultant image magnification $\beta=\beta1*\beta2$. $\beta1$ and $\beta2$ represent the respective image magnifications of the first and second lens groups L1, L2.

In order to now generate equiphased intermediate images h' in the intermediate image plane after the first optical imaging via the first lens group L1, the following equation (1) is met for the lenses of the first lens group L1. In this connection it is understood for equiphased intermediate images that the generated intermediate images h' are identical and take up identical positions in regard to the optical axes of the lenses L1 of the first lens group.

$$d1=n*T \quad (\text{Equ. 1})$$

wherein:
d1=the lens width of a lens of the first lens group L1
T=the graduation period of the scanned incremental graduation
n=a natural number (1, 2, 3, . . . ).

Now the intermediate images h' of the object h created in the intermediate plane between the first and second lens group L1, L2 must be superimposed with the correct phase in the final image on the detector side by the suitable selection of the offset distances $V_i$ for lenses of the second lens group L2. Information regarding the periodic structure of the scanned incremental graduation in the image field must not be destroyed.

In the following reflections it should be assumed that, as already indicated above, the optical axes $OA_{L1}$, $OA_{L2}$ of the centrally arranged lenses of the two lens groups are aligned in the area of the axis of symmetry S and that, starting at the axis of symmetry S, the offset distances $V_i$ increase toward the outside. Therefore, basically the respective offset distance $V_i$ is a function of its distance from the axis of symmetry S and corresponds to a multiple of the values d1 and d2:

$$\beta2*V_i=i*(d1-d2)*\beta2=i*d1, \text{ wherein } i=\text{a natural number } (1, 2, 3, \ldots) \quad (\text{Equ. 2})$$

i.e. $\beta2*(d1-d2)=d1$ (Equ. 3)

wherein $F=d1*d2/(d1-d2)$, (Equ. 4)

d2=the lens width of a lens of the second lens group L2 wherein F provides the maximally possible extension of the lens arrangement in its extension direction. Finally, it applies for F that $$F=\beta2*d2 \quad (\text{Equ. 5})$$

Thus, in (Equ. 5) $\beta2$ indicates the maximal number of lenses in the second lens group L2. Note that the number of lenses in group L1 is automatically determined when the number of lenses for group L2 is determined.

Finally, in connection with the optical imaging of the scanning area with a period incremental graduation, the general case will be explained, wherein a phase-correct offset of the partial images between the individual optical imaged partial areas of the scanning area in the detection area is also possible via the second optical imaging. This means that in the resultant image the information regarding the periodicity of the scanning area is still preserved.

In this case the following then applies:

$$\beta2*(d1-d2)=d1-k*\beta1*\beta2*T \quad (\text{Equ. 6a})$$

and $$\beta2*(n*T-d2)=(n-k*\beta1*\beta2)*T \quad (\text{Equ. 6b})$$

wherein
d1=the lens width of a lens of the first lens group L1,
d2=the lens width of a lens of the second lens group L2,
T=the graduation period of the scanned incremental graduation
k is a natural number>0,
n=a natural number (1, 2, 3, . . . ).
the following equation (Equ. 7) for the lens widths to be selected of the lenses of the second lens group L2:

$$d2=(\beta2*n+k*\beta1*\beta2-n)*T \quad (\text{Equ. 7})$$

The equations (Equ. 1) and (Equ. 7) represent design rules for the suitable lens arrangements under the explained side constraints. The required length widths d1, d2 of the individual lenses in the two lens groups L1, L2 in the extension direction of the lens arrangement are specified by these equations.

Finally, it should be again pointed out in this connection that in spite of the resulting image field reduction it is possible by means of such a lens arrangement to select any resulting image magnification $\beta=\beta1*\beta2$ depending on the requirements. In the example of FIG. 4a, for example, a resulting image magnification $\beta>1$ was realized. An enlargement of a scanned graduation period T of the incremental graduation $M_{INC}$ in the image T' results, i.e. $T'=\beta*T$.

Besides the suitable optical imaging of a scanning range from the scale with a periodic incremental graduation, an optical imaging of a scale with an aperiodic incremental graduation in a reduced image field in the detection plane is also possible by a suitable layout of the lens arrangement. Details of such an optical imaging will be explained in what follows by FIG. 5.

Figure 5:
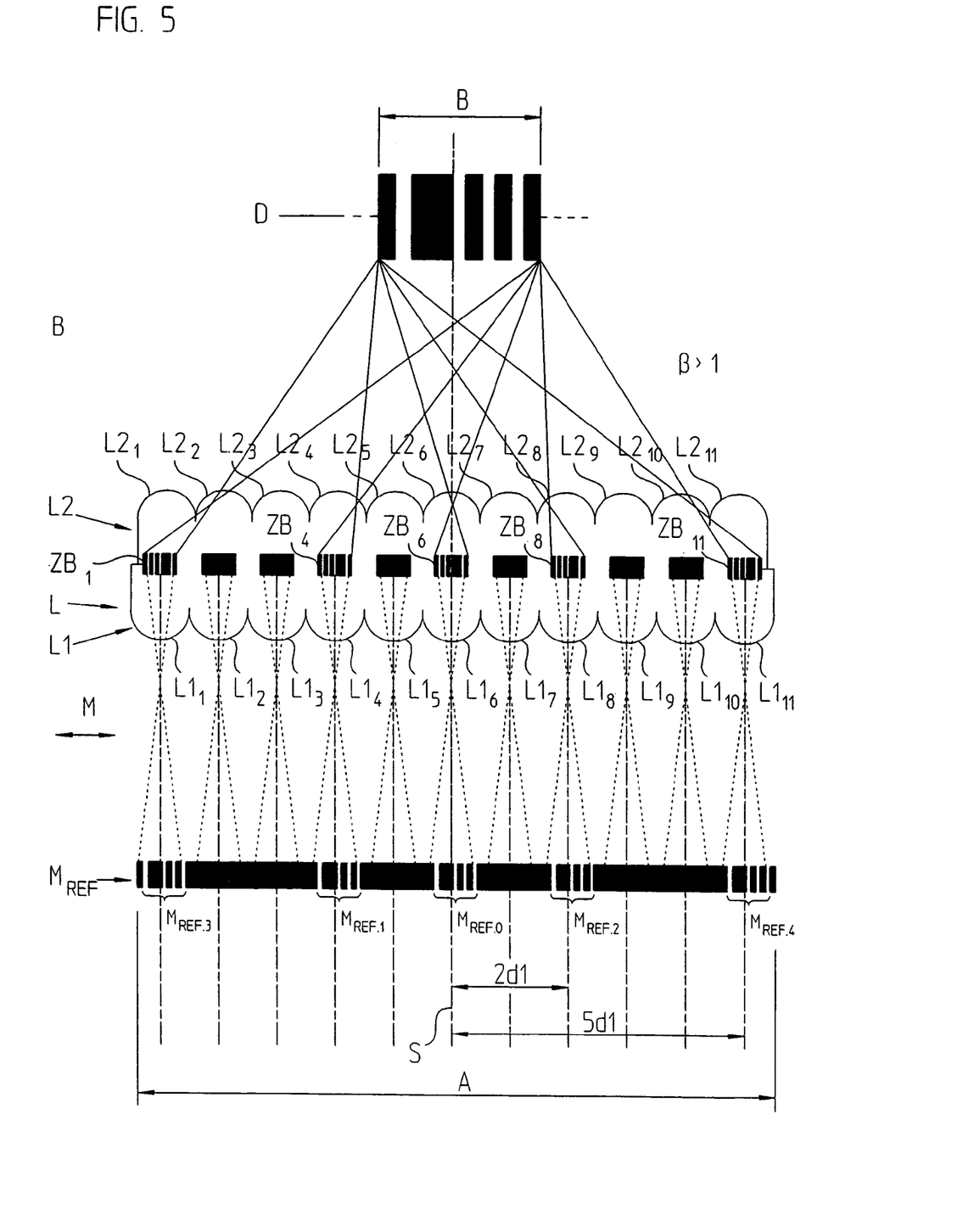
FIG. 5 is a schematic representation for explaining the scanning of a scale with a periodic reference markings with the aid of the scanning units of FIGS. 2 and 3 in accordance with the present invention.

The optical imaging of a scanning area A with an aperiodic reference marking $M_{REF}$ on the part of the scale in a reduced image field B in the detection plane D by a suitable lens arrangement L is shown in FIG. 5.

In the present example, the aperiodic reference marking $M_{REF}$ located in the scanning area A includes a total of five identical reference markings $M_{REF.0}$ to $M_{REF.4}$. Opaque, or non-reflecting areas have been arranged between them on the scale. Each reference marking $M_{REF.0}$ to $M_{REF.4}$ has an aperiodic structure, having a sequence of partial areas with different optical properties (for example opaque/transparent, slightly reflecting/highly reflecting, etc.). The scanning area A with the five reference marking units $M_{REF.0}$ to $M_{REF.4}$ is optically imaged in a reduced image field B in the detection plane by the lens arrangement L with the two lens groups L1, L2. An image of the scanning area A results in the image area B, which has a definite relationship to the aperiodic reference marking $M_{REF}$ arranged in the scanning area A. Here, a superimposition on the image side of the individual reference markings $M_{REF.0}$ to $M_{REF.4}$ into a single final image takes place by the optical imaging by the lens arrangement L, which can be scanned in the detection plane D for creating a single reference signal with the aid of a suitable (not represented) detector unit. The same as already in the example of the incremental graduation, an enlargement of the scanned structure of the scanning area A via the lens arrangement L is provided, i.e. an image magnification $\beta>1$.

For generating a high-quality reference pulse signal it has been provided in the present case to arrange the five identical reference marking units $M_{REF.0}$ to $M_{REF.4}$ on the scale in a defined pattern along the measuring direction M. In this case a symmetrical arrangement of the reference markings $M_{REF.1}$ to $M_{REF.4}$ with respect to the centrally arranged reference marking $M_{REF.0}$ was selected. The reference marking units $M_{REF.1}$ to $M_{REF.4}$ placed to the left and right adjoining the axis of symmetry S are respectively arranged at the distance 2d1, or 5d1 with respect to the central reference marking $M_{REF.0}$. The diameter of a lens $L1_i$ (i=1, ... 11) in the first lens group L1 is here identified by d1. In principle it is also possible to place more than the respectively intended reference marking units $M_{REF.0}$ to $M_{REF.4}$ of the same pattern into the outer areas.

Matched to this arrangement pattern of the reference marking units $M_{REF.0}$ to $M_{REF.4}$, in the lens arrangement L only the lens pairs $L1_i$, $L2_i$ which are arranged in the corresponding pattern are actively taking images. This means that for optical imaging in the present example only the lens pairs $L1_1$, $L2_1$, $L1_4$, $L2_4$, $L1_6$, $L2_6$, $L1_8$, $L2_8$, $L1_{11}$, $L2_{11}$ are used. The pairs of lenses between them are not used and can either be omitted or optically deactivated in another way.

The same as in the above described example with the optical imaging of an incremental graduation, the generation of intermediate images $ZB_1$, $ZB_4$, $ZB_6$, $ZB_8$, $ZB_{11}$ of the aperiodic reference marking units $M_{REF.0}$ to $M_{REF.4}$ now takes place in a first optical imaging step with the aid of the actively imaging lenses $L1_1$, $L1_4$, $L1_6$, $L1_8$, $L1_{11}$ of the first lens group L1. At least the non-central, actively imaging lenses $L2_1$, $L2_4$, $L2_6$, $L2_8$, $L2_{11}$ of the second lens group L2 are again arranged offset with respect to the first lens group L1. Starting at the axis of symmetry S, the selected offset is increased toward the outside. Accordingly, an offset optical imaging of the outer intermediate images $ZB_1$, $ZB_4$, $ZB_6$, $ZB_8$, $ZB_{11}$ in the direction of the axis of symmetry S again takes place in the second imaging step. The offset has been selected in such a way that a phase-correct superimposition of all intermediate images $ZB_1$, $ZB_4$, $ZB_6$, $ZB_8$, $ZB_{11}$ in the reduced image field takes place. The image resulting there has an aperiodicity which has a defined connection with the reference marking $M_{REF}$ which is to be optically imaged.

In the case of the present optical imaging of an aperiodic reference marking, it is not necessary to meet the conditions of the above explained (Equ. 1). The latter is only necessary in the optical imaging of periodic structures in the image area. Then, in connection with the present case only (Equ. 3) of the above discussed equations remains as the dimensioning rule which would have to be taken into consideration inter alia with respect to the diameters d1, d2 of the lenses in the two lens groups L1, L2.

In conclusion, further alternative embodiment variations should be mentioned as complementing the listed exemplary embodiments, which can also all be realized in connection with the above described principle in accordance with the present invention.

Thus, it should again be noted that, besides the explained optically imaging of a directly scanned scanning area on the scale, an image field-reducing optical imaging of an intermediate image could also be provided in accordance with the present invention with the aid of a suitably designed lens arrangement. This can be necessary, for example, in the case of different scanning principles in which an intermediate image can be generated from the interaction of the scanning beam with the scale and further partial structures in the scanning beam path, which contains the relevant scanning information which must be transferred into the detection plane.

It has furthermore been shown to be advantageous to arrange an optical device in front of the light source, which adapts the illumination beam in regard to the reducing optical imaging of the scanning area in the image field on the detector.

The foregoing description is provided to illustrate the invention, and is not to be construed as a limitation. Numerous additions, substitutions and other changes can be made to the present invention without departing from its scope as set forth in the appended claims.

I claim:

1. A scanning unit for a position measuring system for the optical scanning of a scale, said scanning unit comprising:
   a light source for transmitting light in a direction toward a section of a scale;
   a detector for receiving light modified by said scale; and
   a lens arrangement placed in front of said detector, said lens arrangement comprising a plurality of optical lenses and is used for generating a definite image of a scanned scanning area in an image field on said detector, wherein said lens arrangement optically images said scanning area reduced in surface in said image field on said detector.

2. The scanning unit in accordance with claim 1, wherein said plurality of optical lenses comprises a first lens group and a second lens group, each of said first and second lens groups is are respectively assigned to one of two levels extending parallel with respect to each other, and patterns of said first and second lens groups differ from each other.

3. The scanning unit in accordance with claim 2, wherein said first and second lens groups optically act together in such a way that an intermediate image resulting from a first optical imaging via a lens of said first lens group is transferred following a second optical imaging by a lens of said second lens group into a partial image on said detector which is offset in regard to said scanning area, wherein an offset of said partial image on said detector takes place in a direction of an axis of symmetry of said lens arrangement, and a total image on said detector results from phase-correct superimposition of all partial images.

4. The scanning unit in accordance with claim 1, wherein an optical imaging of a scanning area on said scale, or an optical imaging of an intermediate image in a scanning beam path on a detector takes place via said lens arrangement.

5. The scanning unit in accordance with claim 1, further comprising an optical device placed in front of said light source for adapting said light transmitted from said light source in view of a reducing optical imaging of said scanning area on said image field of said detector.

6. The scanning unit in accordance with claim 1, wherein said lens arrangement is embodied for scanning a scale with a periodic incremental graduation in such a way that said image of said scanning area in said image field on said detector also has a defined periodicity, wherein a periodicity of said image has a predetermined relationship with said periodicity of said periodic incremental graduation.

7. The scanning unit in accordance with claim 6, wherein diameters (d1, d2) of lenses of said first and second lens groups of the lens arrangement meet the following conditions:

$$d1 = n*T$$

and $$d2 = (\beta2*n + k*\beta1*\beta2 - n)*T,$$

wherein:
d1=a lens width/diameter of a lens of said first lens group,
d2=a lens width/diameter of a lens of said second lens group,
T=a graduation period of said incremental graduation
$\beta1$=an image magnification of said first lens group
$\beta2$=an image magnification of said second lens group
n=a natural number (1, 2, 3, ... )
k=a natural number (1, 2, 3, ... ).

8. The scanning unit in accordance with claim 3, wherein an offset of all individual partial images via an image by said second lens group results in such a way that all individual partial images are at least partially superimposed on top of each other in said image field on said detector.

9. The scanning unit in accordance with claim 1, wherein said lens arrangement is designed to scan a scale with an aperiodic reference marking and is embodied in such a way that said image of said scanning area on said detector has a definite aperiodicity, which has a predetermined relationship with said aperiodic reference marking.

10. The scanning unit in accordance with claim 9, wherein said lens arrangement comprises image-active lenses only in a pattern of said aperiodic reference marking.

11. The scanning unit in accordance with claim 9, wherein said lens arrangement meets the following equation:

$$\beta2*(d1-d2) = d1,$$

wherein:
d1=a lens width of a lens of said first lens group
d2=a lens width of a lens of said second lens group
$\beta2$=Image magnification of said second lens group.

12. A position measuring system comprising:
a scale comprising an optically scannable track; and
a scanning unit comprising:
a light source for transmitting light in a direction toward a section of said scale;
a detector for receiving light modified by said scale; and
a lens arrangement placed in front of said detector, said lens arrangement comprising a plurality of optical lenses and is used for generating a definite image of a scanned scanning area in an image field on said detector,
wherein said lens arrangement optically images said scanning area reduced in surface in said image field on said detector.

13. The position measuring system in accordance with claim 12, wherein said scale comprises a periodic incremental graduation.

14. The position measuring system in accordance with claim 12, wherein said scale comprises an aperiodic reference marking that comprises several identically embodied reference marking units of an aperiodic structure, which are arranged in a definite pattern along a measuring direction, which corresponds to a pattern of said plurality of optical lenses.

* * * * *

UNITED STATES PATENT AND TRADEMARK OFFICE
CERTIFICATE OF CORRECTION

PATENT NO. : 7,423,768 B2  Page 1 of 1
APPLICATION NO. : 11/391885
DATED : September 9, 2008
INVENTOR(S) : Ulrich Benner It is certified that error appears in the above-identified patent and that said Letters Patent is hereby corrected as shown below:

In column 10, claim 2, line 37, before "respectively assigned" delete "are".

In column 11, claim 7, line 14, immediately after "incremental graduation" insert --,--.

In column 11, claim 7, line 15, immediately after "first lens group" insert --,--.

In column 11, claim 7, line 16, immediately after "second lens group" insert --,--.

In column 11, claim 7, line 17, immediately after "(1, 2, 3, . . .)" insert --, and--.

In column 12, claim 11, line 5, immediately after "first lens group" insert --,--.

In column 12, claim 11, line 6, immediately after "second lens group" insert --,--.

In column 12, claim 11, line 7, before "magnification of said" delete "Image" and substitute --image-- in its place.

Signed and Sealed this

Second Day of June, 2009

JOHN DOLL
*Acting Director of the United States Patent and Trademark Office*